US011993482B2

(12) United States Patent
Haapaniemi et al.

(10) Patent No.: US 11,993,482 B2
(45) Date of Patent: May 28, 2024

(54) METHOD AND ARRANGEMENT

(71) Applicant: Kone Corporation, Helsinki (FI)

(72) Inventors: Markku Haapaniemi, Helsinki (FI); Matti Rasanen, Helsinki (FI); Sami Saarela, Helsinki (FI); Anssi Venho, Helsinki (FI); Janne Mikkonen, Helsinki (FI); Otto Lanz, Helsinki (FI); Tarvo Viita-Aho, Helsinki (FI); Emil Hagstrom, Helsinki (FI); Simo Makimattila, Helsinki (FI); Kristian Viinikkala, Helsinki (FI); Peter Eagling, Helsinki (FI); Timo Rinne, Helsinki (FI); Petri Kere, Helsinki (FI)

(73) Assignee: Kone Corporation, Helsinki (FI)

( * ) Notice: Subject to any disclaimer, the term of this patent is extended or adjusted under 35 U.S.C. 154(b) by 88 days.

(21) Appl. No.: 17/569,086

(22) Filed: Jan. 5, 2022

(65) Prior Publication Data

US 2022/0127110 A1 Apr. 28, 2022

Related U.S. Application Data

(63) Continuation of application No. PCT/EP2020/069567, filed on Jul. 10, 2020.

(30) Foreign Application Priority Data

Jul. 12, 2019 (EP) .................................. 19186054.3

(51) Int. Cl.
*B66B 1/34* (2006.01)
*B66B 1/06* (2006.01)
(Continued)

(52) U.S. Cl.
CPC .............. *B66B 1/3492* (2013.01); *B66B 1/06* (2013.01); *B66B 9/187* (2013.01); *B66B 11/006* (2013.01)

(58) Field of Classification Search
CPC ......... B66B 1/3492; B66B 1/06; B66B 9/187; B66B 11/006; B66B 17/20; B66B 1/3423; B66B 5/0018; B66B 5/02; E04G 21/16
See application file for complete search history.

(56) References Cited

U.S. PATENT DOCUMENTS

2015/0227122 A1* 8/2015 Harkonen ............... B66C 13/18 700/275
2017/0183156 A1* 6/2017 Yoshioka ............ H01L 21/6773

FOREIGN PATENT DOCUMENTS

EP 3456677 A1 3/2019
EP 3663251 A1 * 6/2020
(Continued)

OTHER PUBLICATIONS

Extended European Search Report dated Feb. 2, 2020.
International Search Report PCT/ISA/210 and Written Opinion PCT/ISA/237 for PCT/EP2020/069567 dated Nov. 16, 2020.

*Primary Examiner* — Jeffrey Donels
(74) *Attorney, Agent, or Firm* — Harness, Dickey & Pierce, P.L.C.

(57) ABSTRACT

The invention relates to a method for transporting construction material and/or equipment inside a building under construction, wherein the building under construction comprises plurality of vertically displaced floors, the method comprising providing an elevator for transporting transport containers in the building under construction, said elevator comprising at least a load receiving unit vertically movable along one or more guide rail lines in an elevator shaft formed in the building under construction; and providing plurality of transport containers each comprising a container body, and an identification provided on the container body for identifying the container and/or its destination in the building, most preferably the destination floor in the building under construction; providing one or more detectors within the building under construction for detecting identifications of containers when they are within the detection ranges of the one or more detectors; moving a first transport container belonging to said plurality of transport containers to a loading floor; loading the first transport container belonging to said plurality of containers on the load receiving unit; determining by a control system destination floor of the first container comprising detecting the identification of the first transport container with a detector; automatically moving the load receiving unit vertically in the elevator shaft to the destination floor of the first container; and unloading the first transport container from the load receiving unit to the destination floor of said first container. The invention also (Continued)

relates to a method for constructing a building and an arrangement, which implement the aforementioned method.

22 Claims, 4 Drawing Sheets

(51) Int. Cl.
*B66B 9/187* (2006.01)
*B66B 11/00* (2006.01)

(56) References Cited

FOREIGN PATENT DOCUMENTS

| | | | | |
|---|---|---|---|---|
| EP | 3763654 | A1 * | 1/2021 | ........... B66B 1/2416 |
| JP | H0978841 | A | 3/1997 | |
| JP | 2001/055833 | A | 2/2001 | |

* cited by examiner

METHOD AND ARRANGEMENT

CROSS-REFERENCE TO RELATED APPLICATION

This application is a continuation of PCT International Application No. PCT/EP2020/069567 which has an International filing date of Jul. 10, 2020, and which claims priority to European patent application number 19186054.3 filed Jul. 12, 2019, the entire contents of both of which are incorporated herein by reference.

FIELD OF THE INVENTION

The invention relates to a method and an arrangement for transporting construction material and/or equipment inside a building under construction. The invention also relates to a method for constructing a building.

BACKGROUND OF THE INVENTION

During construction work of a building, people and goods need to move into and around the building under construction for enabling construction work. For example, goods, such as tools, equipment and construction material need to move to the floor where they are to be used. In a building under construction comprising plurality of floors, such as a high-rise tower building, the amount of goods constantly flowing into different parts of the building under construction is considerable.

In common prior art methods, which are used in construction sites of high-rise tower buildings, diversity of different means and methods for transportation are used in a relatively unsystematic manner. Such means have comprised use of building site cranes, different temporary hoist arrangements, temporary construction time elevators traveling against the outer face of the building under construction, as well as construction time passenger elevators. The goods have been packed in diverse different packages by the suppliers, and transported into their destination floors in diverse different ways.

A drawback has been that goods transportation in buildings under construction, especially in high-rise tower buildings, has not been optimally efficient and well organized. It has been difficult to schedule and ensure timely, safe and reliable flow of goods to the sites where they are needed. Sometimes, traffic has caused delays to deliveries as well as difficulties to scheduling and coordinating different other actions and operations to be carried out at the construction site, such as slip forming or use of construction site cranes, elevators or hoists. Nor have the prior solution ensured smooth transition to serving transportation needs of the final building.

BRIEF DESCRIPTION OF THE INVENTION

The object of the invention is to introduce a new method and a new arrangement for transporting construction material and/or equipment inside a building under construction, as well as a new method for constructing a building. An object is to introduce new solutions by which one or more of the above defined problems of prior art and/or problems discussed or implied elsewhere in the description can be solved. An object is particularly to introduce new solutions facilitating efficiency of delivery of goods and ability to supervise and/or manage the process during construction time of a building. An object is moreover to introduce new solutions which provide efficient and timely flow of goods during construction time of a building.

Embodiments are disclosed, inter alia, by which goods can be delivered on time, not too early nor too late, to the floor where they are needed.

Embodiments are disclosed, inter alia, by which at the same time a smooth transition to serving transportation needs of the final building is facilitated, which needs may be different from those of the building during construction time thereof.

Embodiments are disclosed, inter alia, by which progress of the transport can be monitored and/or affected by a person.

Embodiments are disclosed, inter alia, by which goods can be delivered to the floor where they are needed without causing excessively traffic.

It is brought forward a new method for transporting construction material and/or equipment inside a building under construction, wherein the building under construction comprises plurality of vertically displaced floors, the method comprising providing an elevator for transporting transport units, which are preferably transport containers, in the building under construction, said elevator comprising at least a load receiving unit vertically movable along one or more guide rail lines in an elevator shaft formed in the building under construction; and providing plurality of transport units each carrying construction material and/or equipment, which transport units are preferably transport containers, each comprising an identification provided on the transport unit, such as on a container body thereof, for identifying the transport unit and/or its destination in the building under construction such as preferably its destination floor in the building under construction; and providing one or more detectors, in particular within the building under construction, for detecting identifications of transport units when they are within the detection ranges of the one or more detectors; moving a first transport unit belonging to said plurality of transport units to a loading floor; loading the first transport unit belonging to said plurality of transport units on the load receiving unit; determining by a control system destination floor of the first container comprising at least detecting the identification of the first transport unit with a detector; and automatically moving the load receiving unit vertically in the elevator shaft to the destination floor of the first transport unit; and unloading the first transport unit from the load receiving unit to the destination floor of said first transport unit. With this solution one or more of the above mentioned objects can be achieved. The method particularly increases smooth, well organized delivery of goods to its destination.

Using in the method an elevator as mentioned also facilitates a smooth transition to serving transportation needs of the final building, whereby the transportation solution can be temporary yet economical. The method moreover is simple to monitor when desired, e.g. using a database the information of which may be accessible by a person by using a mobile device, which facilitates that information about each transport container, such as the location, state or contents thereof, are easily accessible. The method is well suitable for being implemented with a high rate of automatization, whereby efficiency of delivery of goods to its destination floor can be facilitated.

Preferable further details are introduced in the following, which further details can be combined with the method individually or in any combination In a preferred embodiment, said transport units are transport containers each comprising a container body, in particular delimiting an interior where the construction material and/or equipment carried by the transport container are positioned, and an identification provided on the container body for identifying the container and/or its destination in the building under construction such as preferably the destination floor in the building under construction. The method utilizing plurality of transport containers as mentioned, provides that they can be made to be uniform such that they easily can be efficiently transported and their identifications detected with the same means. The goods transport is hereby simple to maintain well organized and under supervision and such that low amount of traffic is caused in the building under construction. Preferably, the body of the container comprises metal, preferably majority (i.e. more than half) of its weight is produced by metal material. This means that the containers are preferably metal containers and they are durable for use in many construction sites.

In a preferred embodiment, said transport units are transport containers each having four walls, a ceiling and a floor. One or more of the walls of each container can be openable or comprise a door. It is preferable that the containers are rectangular cuboids.

In a preferred embodiment, the method comprises after said unloading moving, preferably automatically, the load receiving unit back to the loading floor for receiving a further transport unit to be moved to its destination floor.

In a preferred embodiment, the method moreover comprises storing the plurality of transport units in a storage, which is preferably outside the building under construction.

In a preferred embodiment, said automatically moving the load receiving unit vertically in the elevator shaft to the destination floor of the first transport unit comprises controlling by the control system, preferably by a sub-control system of the control system, the elevator to move the load receiving unit vertically in the elevator shaft to the destination floor of the first transport unit.

In a preferred embodiment, said identification stores or presents in a detectable manner an identification code of the transport unit in question and/or its destination floor in the building under construction. The identification codes of the transport units are preferably different.

In a preferred embodiment, the control system comprises a database. The database is preferably stored in a cloud such as a cloud comprised in the control system.

In a preferred embodiment, said determining comprises retrieving from a database the destination floor associated with an identification code of the transport unit in question.

In a preferred embodiment, the method comprises providing a control system for automatically controlling movement of the load receiving unit.

In a preferred embodiment, said detecting the identification of the first transport unit and/or each said further transport unit with a detector is performed when the transport unit is at the loading floor or at least partially on the load receiving unit, preferably said detector being mounted at the loading floor or on the load receiving unit.

In a preferred embodiment, said one or more detectors comprise plurality of detectors within the building under construction at spaced apart locations, preferably including one or more of: a detector at the entrance of the building under construction, a detector at the loading floor, a detector on the load receiving unit, a detector at one or more destination floors.

In a preferred embodiment, the detectors are such that each said detector has a detection range, whereby detection of an identification of a transport unit within the detection range indicates that the transport unit is within the detection range, and thereby the location of the transport unit. The detector can be an RFID-detector, for example in which case the identification equipment preferably comprises an RFID-tag.

In a preferred embodiment, the database stores location codes associated with identification codes of transport units. Particularly, preferably the database stores a location code associated with the identification code of each transport unit, the location code preferably indicating location of the transport unit in question.

In a preferred embodiment, the database is readable by a user interface program installed on a mobile communication device, such as a phone or a tablet.

In a preferred embodiment, the database is modifiable by a user interface program installed on a mobile communication device, such as a phone or a tablet.

In a preferred embodiment, The control system is configured to automatically update in the database the location code of a transport unit in response to detection of the identification of the transport unit by a detector and/or the control system is configured to automatically send a signal to a program installed on a mobile communication device, such as a phone or a tablet in response to detection of the identification of the transport unit by a detector.

In a preferred embodiment, a program installed on a mobile communication device, such as a phone or a tablet is preferably configured to detect a change in location code of a transport unit. The program can preferably further be configured to indicate, e.g. on a display thereof, to the user of the mobile communication device an alarm or the updated location of the transport unit.

In a preferred embodiment, the method comprises moving a further transport unit belonging to said plurality of transport units to a loading floor comprising: loading (in particular after the aforementioned moving the load receiving unit back to the loading floor) on the load receiving unit a further transport unit belonging to said plurality of transport units; and determining by the control system destination floor of the further transport unit comprising detecting the identification of the further transport unit with a detector; and automatically moving the load receiving unit vertically in the elevator shaft to the destination floor of the further transport unit; and unloading the further transport unit from the load receiving unit to the destination floor of said further transport unit; and preferably moving preferably automatically the load receiving unit back to the loading floor. Said automatically moving the load receiving unit vertically in the elevator shaft to the destination floor of the further transport unit preferably comprises controlling by the control system, preferably by a sub-control system of the control system, the elevator to move the load receiving unit vertically in the elevator shaft to the destination floor of the further transport unit.

In a preferred embodiment, the steps of the preceding paragraph are repeated for plurality of times, such as for 2 or 3 or 4 or 5, or more than 5 times.

In a preferred embodiment, the destination floors of the first transport unit and the aforementioned further transport unit(s) include plurality of different destination floors, such as 2 or 3 or 4 or 5, or more than 5 different destination floors. With high volumes and high number of different destinations the easy management and high efficiency of the delivery of the transport units is particularly advantageous due to ensuring low traffic in the building under construction and reduced amount of delays in the deliveries and thereby reduced amount of delays in the construction process.

In a preferred embodiment, said loading the (first/further) transport unit on the load receiving unit is performed automatically controlled by the control system, preferably automatically controlled by a sub-control system thereof, which sub-control system is configured to automatically operate one or more loading devices.

In a preferred embodiment, said unloading a (the first/further) transport unit from the load receiving unit to its destination floor is performed automatically controlled by the control system, in particular automatically controlled by a sub-control system thereof, which sub-control system is configured to automatically operate one or more unloading devices.

In a preferred embodiment, said one or more loading devices comprise a loading device mounted on the load receiving unit, preferably on top of a transport platform of the load receiving unit and/or a loading device mounted at the loading floor, preferably in front of an opening leading to the shaft in which the load receiving unit is movable.

In a preferred embodiment, said one or more unloading devices comprise an unloading device mounted on the load receiving unit, preferably on top of a transport platform of the load receiving unit and/or loading devices mounted at destination floors, preferably in front of openings leading to the shaft in which the load receiving unit is movable.

In a preferred embodiment, each said loading and/or unloading device comprises a conveyor comprising conveying track on top of which a transport unit can be moved horizontally supported by the conveying track. The conveying track is preferably motor driven. Preferably, each of the conveyors is a roller conveyor, or alternatively a belt conveyor.

In a preferred embodiment, the identification is in the form of an identification equipment mounted on the transport unit, preferably on a container body thereof or markings printed on the transport unit, preferably on a container body thereof or on any element mounted thereon. The identification is preferably detectable, e.g. by a detector, such as an electronic detector, from the outside of the transport unit, in particular without entering or opening the container. The detector can be any kind of device capable of detecting an identification, for instance a RFID-detector in which case the aforementioned identification equipment preferably comprises an RFID-tag. The detector can alternatively be for instance a so called Bluetooth device.

In a preferred embodiment, the building under construction is preferably such that it has not reached its final height yet, the upper parts thereof still being missing. Hereby, preferably during the method, the building under construction is constructed to be higher, most preferably during the method new floors are constructed on existing floors of the building under construction.

It is also brought forward a new method for constructing a building comprising transporting construction material and/or equipment inside a building under construction as described anywhere above, and constructing structures of the building under construction using said construction material and/or equipment transported in the floors of the building under construction. With this solution one or more of the above mentioned objects can be achieved.

Preferable further details have been introduced already above, and moreover in the following, which further details can be combined with the method individually or in any combination.

In a preferred embodiment, the method comprises constructing a passenger elevator in place of the aforementioned elevator, said constructing comprising constructing a passenger elevator car for transporting people in place of the load receiving unit of the elevator, wherein the passenger elevator car is made to comprise an interior delimited by floor, walls, ceiling and at least one automatic door; and thereafter using the passenger elevator car to transport passengers between floors of the building. Hereby, after efficient construction phase transport of goods, a smooth transition to serving transportation needs of the final building is facilitated, which needs are different from those of the building during construction time thereof. Said using preferably comprises receiving call signals from user interfaces, such as from user interfaces located at floors of the building and/or in the passenger elevator car and/or mobile user interfaces, and moving the passenger elevator car in response to said call signals.

In a preferred embodiment, the aforementioned constructing a passenger elevator car comprises installing a new automatic door. The automatic door preferably comprises at least two sliding door leaves.

In a preferred embodiment, the load receiving unit of the elevator for transporting transport units does not comprise an automatic door. It may not comprise a door at all. Hereby, it is not intended for passenger transport. Due to lower safety requirements, a door can be even omitted totally, which makes loading and unloading of transport units quick and smooth. This also makes it simple to implement the loading and unloading with automatically operated transporting device(s).

In a preferred embodiment, the load receiving unit of the elevator for transporting transport units does not comprise an interior delimited by floor, walls, ceiling and an automatic door.

In a preferred embodiment, the load receiving unit of the elevator for transporting transport units is vertically movable along one or more vertically oriented guide rail lines in an elevator shaft. Thus, heavy and large transport units can be transported in the shaft with relatively high speed and safety. The guide rail lines can optionally be utilized in the final elevator, whereby a later transformation of the goods elevator to form a passenger elevator in its place is facilitated.

In a preferred embodiment, in said constructing the passenger elevator car is arranged to be vertically movable along one or more of the vertically oriented guide rail lines of the load receiving unit of the elevator for transporting goods.

It is also brought forward a new arrangement for transporting construction material and/or equipment inside a building under construction, wherein the building under construction comprises plurality of vertically displaced floors, the arrangement comprising an elevator for transporting transport units, which are preferably transport containers, in the building under construction, said elevator comprising at least a load receiving unit vertically movable along one or more guide rail lines in an elevator shaft formed in the building under construction; and plurality of transport units each carrying construction material and/or equipment, which transport units are preferably transport containers, each comprising an identification provided on the transport unit, such as on a container body thereof for identifying the transport unit and/or its destination in the building such as preferably its destination floor in the building under construction; and one or more detectors, preferably within the building under construction for detecting identifications of transport units when they are within the detection ranges of the one or more detectors; and a control system configured to determine destination floor of the first transport unit said determining comprising at least detecting the identification of the first transport unit with a detector; and to automatically control the elevator, preferably by a sub-control system of the control system, which sub-control system is configured to automatically control movement of the load receiving unit, to move the load receiving unit vertically in the elevator shaft to the destination floor of the first transport unit for being unloaded to said destination floor of said first transport unit. With this solution one or more of the above mentioned objects can be achieved.

Preferable further details have been introduced already above, and moreover in the following, which further details can be combined with the arrangement individually or in any combination.

In a preferred embodiment, said transport units are transport containers as defined anywhere above.

In a preferred embodiment, the control system is configured to automatically control the elevator, preferably by a sub-control system of the control system, which sub-control system is configured to automatically control movement of the load receiving unit, to move the load receiving unit vertically in the elevator shaft back to the loading floor for receiving a further transport container to be moved to its destination floor.

In a preferred embodiment, the control system is configured to determine destination floor of a further container, said determining comprising at least detecting the identification of the further transport unit with a detector; and to automatically control the elevator, preferably by a sub-control system of the control system, which sub-control system is configured to automatically control movement of the load receiving unit, to move the load receiving unit vertically in the elevator shaft to the destination floor of the further transport unit for being unloaded to said destination floor of said further transport unit; and preferably to automatically control the elevator, in particular by a sub-control system of the control system, which sub-control system is configured to automatically control movement of the load receiving unit, to move the load receiving unit vertically in the elevator shaft back to the loading floor for receiving a further transport unit to be moved to its destination floor.

In a preferred embodiment, the arrangement comprises one or more loading devices for moving a transport unit to be loaded between the loading floor and the load receiving unit, said moving comprising at least horizontal movement, preferably through an opening leading into the elevator shaft. Said one or more loading devices preferably comprise a loading device mounted on the load receiving unit, preferably on top of a transport platform of the load receiving unit and/or a loading device mounted at the loading floor, preferably in front of an opening leading to the shaft in which the load receiving unit is movable.

In a preferred embodiment, the controls system, preferably a sub-control system thereof, is configured to automatically operate the one or more loading devices.

In a preferred embodiment, the arrangement comprises one or more unloading devices for moving a transport unit to be unloaded between the load receiving unit and a destination floor said moving comprising at least horizontal movement, preferably through an opening leading into the elevator shaft. Said one or more unloading devices preferably comprise an unloading device mounted on the load receiving unit, preferably on top of a transport platform of the load receiving unit and/or unloading devices mounted at destination floors, preferably in front of openings leading to the shaft in which the load receiving unit is movable.

In a preferred embodiment, the controls system, preferably a sub-control system thereof, is configured to automatically operate the one or more unloading devices.

In a preferred embodiment, the detector is a RFID-detector in which case the aforementioned identification equipment preferably comprises an RFID-tag. The detector can alternatively be for instance a so called Bluetooth device.

In a preferred embodiment, the elevator shaft is a space inside the building.

In a preferred embodiment, the elevator shaft is surrounded by walls of the building, said walls preferably being concrete walls.

In a preferred embodiment, the transport units are of same or at least substantially same size and shape.

In a preferred embodiment, the containers are such large that the interior of each container is at least 4 m3 in volume, preferable larger, such as at least 8 m3 in volume. Thus, they can all serve for transporting inside them various different large objects. The width height and length of each container are each at least 1 m, preferable larger.

In a preferred embodiment, the control system comprises a main control system to which one or more sub-control systems are connected. The main control system can be configured to send signals to one or more sub-control systems for controlling their operation and it can be configured to receive signals from the sub-control systems, whereby monitoring of their operation is facilitated.

In a preferred embodiment, said construction material comprises elements to be installed to form part of the building under construction, such as one or more of panels, doors, windows, wall elements, ceiling elements, electric wires, floor elements, appliances, such as kitchen appliances, or any other construction material such as sand or concrete.

In a preferred embodiment, said equipment to be transported into and inside a building under construction is construction equipment. Said construction equipment preferably comprises tools and/or machines. Said equipment to be transported into and inside a building under construction can alternatively comprise a construction site toilet or a construction site kitchen. When the transport unit is a container as mentioned and described anywhere in the application, said equipment will be delivered safely and unharmed. Also, when the transport unit is a container as mentioned and described anywhere in the application, said equipment or parts thereof can be kept inside the container in which they were delivered during their use, and afterwards removed from the site and from the building inside the same container in which they were delivered, which is efficient and simple. This is moreover hygienic when the equipment comprise a construction site toilet or a construction site kitchen.

BRIEF DESCRIPTION OF THE DRAWINGS

In the following, the present invention will be described in more detail by way of example and with reference to the attached drawings, in which.

DETAILED DESCRIPTION

Figure 1:
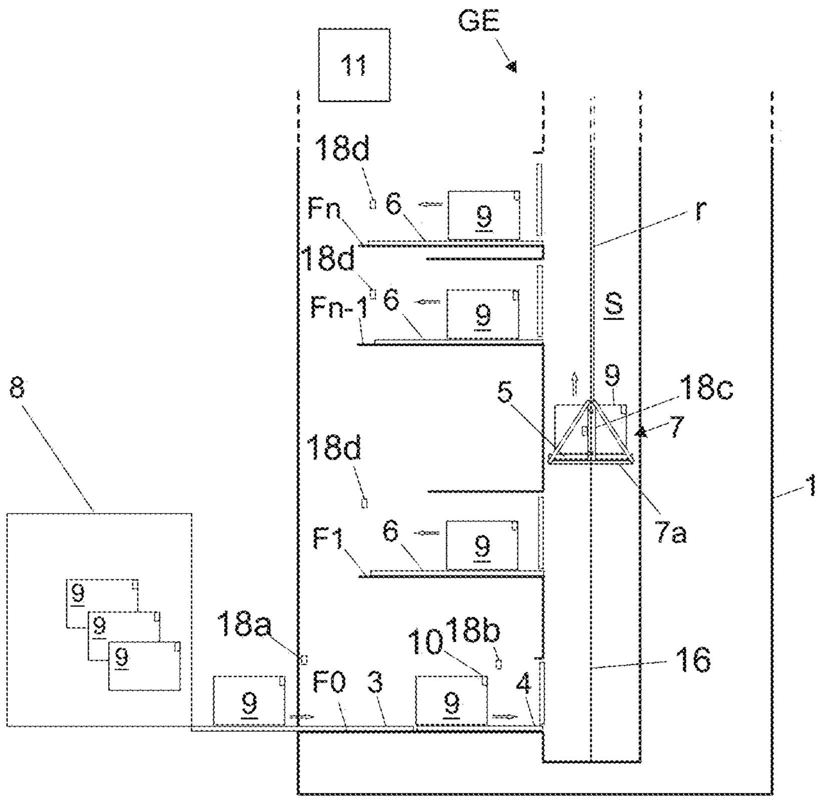
FIG. 1 illustrates an arrangement for transporting construction material and/or equipment inside a building under construction according to the invention implementing a method according to the invention.

FIG. 1 illustrates an arrangement as well as progress of a method for transporting construction material and/or equipment inside a building 1 under construction. The building 1 under construction comprises plurality of vertically displaced floors F0-Fn.

The method comprises providing an elevator GE (also referred to as goods elevator) for transporting transport units 9, the transport units preferably being transport containers 9 (also referred to as containers), in the building under construction 1, said elevator GE comprising at least a load receiving unit 7 vertically movable in an elevator shaft S formed in the building under construction 1, in particular along one or more guide rail lines 16 mounted in the elevator shaft S. The load receiving unit 7 preferably comprises at least a transport platform *7a* on top of which a transport container 9 can be carried by the load receiving unit 7.

Figure 2:
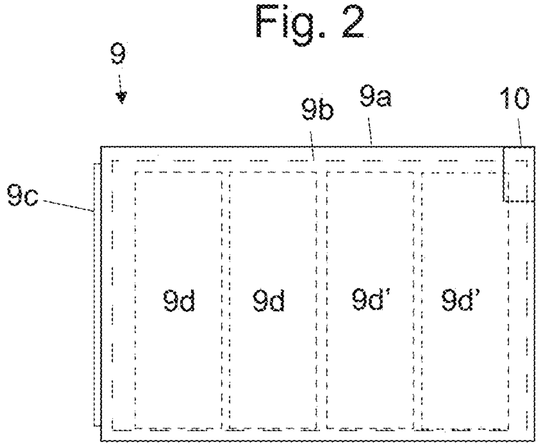
FIG. 2 illustrates preferred details of a transport unit in the form of a transport container.

The method moreover comprises providing plurality of transport containers 9 each comprising a container body *9a* delimiting an interior *9b* where the construction material *9d* and/or equipment *9d'* stored by the container are positioned, and an identification 10 provided on the container body *9a* identifying the container and/or its destination, such as its destination floor (F0-Fn), in the building under construction 1. The identification 10 can be for example an identification equipment mounted on the container body *9a* or markings printed on the container body *9a* or an element mounted thereon. The body *9a* of each container preferably moreover comprises an openable wall or door *9c*, which may or may not be similar in shape and position in different containers 9. A container 9 of this kind is illustrated in FIG. 2.

The method preferably comprises storing the plurality of transport containers 9 in a storage 8, illustrated in FIG. 1, which storage 8 is preferably outside the building under construction 1. Hereby, they can wait until the moment they are needed in a place where they do not disturb building process nor cause traffic.

The method moreover comprises providing one or more detectors *18a-18d* within the building under construction 1 for detecting identifications 10 of containers 9 when they are within the detection ranges of the one or more detectors *18a-18d*. In the preferred embodiment of FIG. 1, said detectors *18a-18d* comprise plurality of detectors *18a-18d* within the building at spaced apart locations for detecting identifications 10 of containers 9, in particular including a detector *18a* at the entrance of the building under construction 1, a detector *18b* at the loading floor F0, a detector *18c* on the load receiving unit 7, detectors *18d* at plurality of destination floors F1-Fn.

The method moreover comprises providing a control system 11 for automatically controlling, inter alia, movement of the load receiving unit 7. The control system 11 is preferably connected with said detectors *18a-18d*.

The method moreover comprises moving said plurality of transport containers 9 to their destination floors F1-Fn in the building under construction 1.

Each said transport container 9 is preferably moved to its destination floor F1-Fn with the same steps as will be described referring to a first container.

Figure 3:
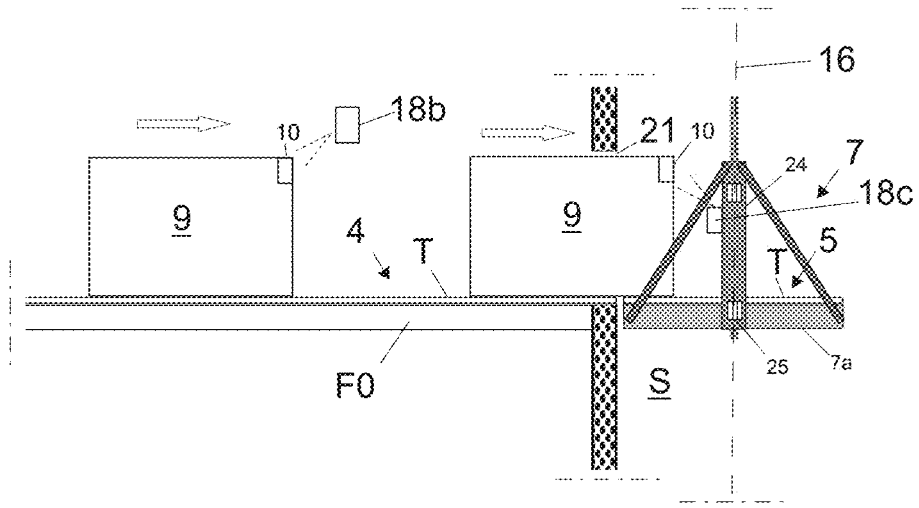
FIG. 3 illustrates preferred details of the arrangement and method of FIG. 1 and the method wherein a transport container is being loaded on a load receiving unit.

The method comprises moving a first transport container 9 belonging to said plurality of transport containers 9 to a loading floor F0, and loading the first transport container 9 belonging to said plurality of containers 9 on the load receiving unit 7, which the load receiving unit 7 has been moved to the loading floor F0, and determining by a control system 11 destination floor of the first container 9. The determining comprises detecting the identification 10 of the first transport container 9 with a detector *18b*,*18c*. Said detecting the identification 10 of the first transport container 9 with a detector is preferably performed when the first transport container 9 is at the loading floor F0 or at least partially on the load receiving unit 7. Preferably said detector is a detector *18b*,*18c* mounted at the loading floor F0 or on the load receiving unit 7, respectively. The determination being performed by the control system 11, facilitates efficiency of the process of delivery of the first container 9 to its destination floor (F1-Fn). FIG. 3 illustrates preferred details of said loading step and said detecting step.

Figure 6:
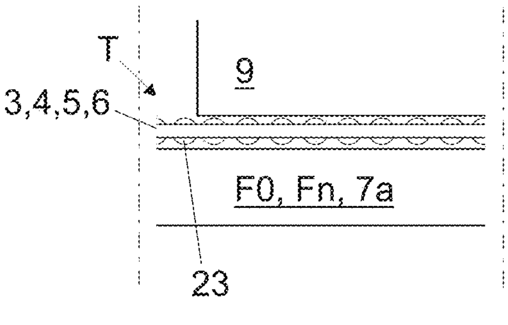
FIG. 6 illustrates preferred further details of the arrangement of FIGS. 1, 3 and 4.

The control system 11 preferably comprises a database D as illustrated in FIG. 6. Said determining comprises retrieving from the database D the destination floor F1-Fn associated with an identification code of the transport container 9 in question.

The method comprises, after said determining and said loading, automatically moving the load receiving unit 7 vertically in the elevator shaft S to the destination floor (one or floors F1-Fn) of the first container 9. Said moving is performed automatically, wherein said automatically moving comprises controlling by the control system 11, in particular by a sub-control system 30 of the control system 11 the elevator to move the load receiving unit 7 vertically in the elevator shaft to the destination floor (F1-Fn) of the first container 9. This facilitates efficiency of the process of delivery of the first container 9 to its destination floor F1-Fn.

The method comprises, after said moving the load receiving unit 7 vertically in the elevator shaft S to the destination floor (one or floors F1-Fn) of the first container 9, unloading the first transport container 9 from the load receiving unit 7 to the destination floor F1-Fn of said first container 9. After the unloading, the method comprises moving, preferably automatically, the load receiving unit 7 back to the loading floor F0, in particular for receiving a further transport container 9 to be moved to its destination floor.

Figure 4:
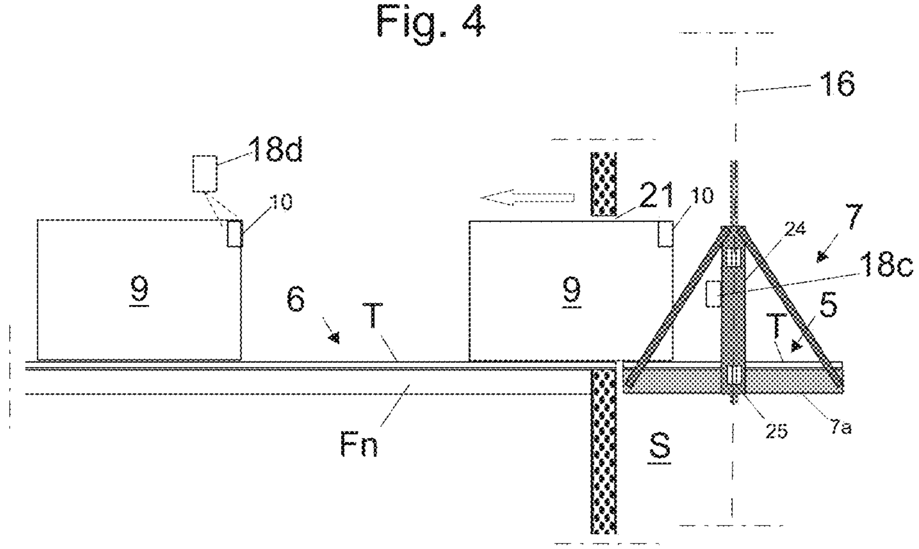
FIG. 4 illustrates preferred details of the arrangement and the method wherein a container is being unloaded from a load receiving unit.
Figure 5:
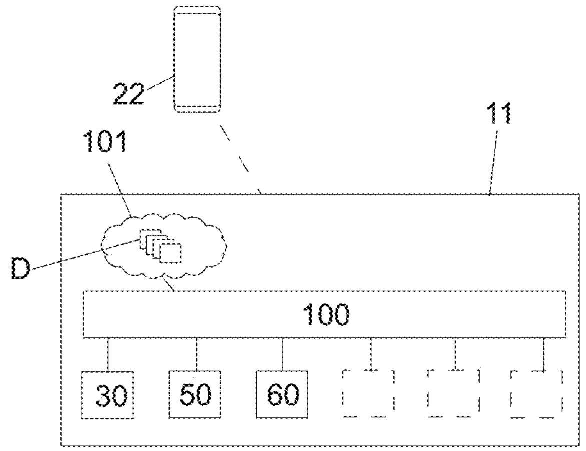
FIG. 5 illustrates preferred details of the control system.

FIG. 4 illustrates preferred details of said unloading step and said detecting step.

Generally, it is preferable that each said identification 10 stores or presents in a detectable manner an identification code of the container 9 in question and/or its destination floor F1-Fn in the building 1 under construction.

The identification codes of the containers 9 are preferably different from each other.

The detectors *18a-18d* are preferably more specifically such that each said detector *18a-18d* has a detection range, whereby detection of an identification 10 of a container 9 within the detection range indicates that the container 9 is within the detection range and thereby the location of the container. The detector is preferably an RFID-detector in which case the identification equipment 10 preferably comprises an RFID-device such as an RFID-tag.

FIG. 6 illustrates preferred details of the elevator arrangement and the control system 11 whereby the method can be implemented. As illustrated, the control system 11 comprises preferably a main control system 100 and sub-control systems 30-60.

The database D preferably stores a location code associated with the identification code of each container, the location code preferably indicating location of the container 9 in question.

The database can be stored physically anywhere as long as it is accessible sufficiently reliably. Preferably, it is stored in a cloud 101 comprised in the control system.

The database is preferably readable by a user interface program installed on a mobile communication device 22, such as a phone or a tablet.

The database is preferably modifiable by a user interface program installed on a mobile communication device, such as a phone or a tablet. Preferably, for example the data stored in the database is modifiable by a user interface program installed on a mobile communication device, such as a phone or a tablet, the data being any data associated with an identification code of a container such as a destination floor of the container, or time of delivery of the container 9, for example. Preferably, an order of delivery of a container can be sent to the control system 11 or stored in the database by the user interface program.

The control system 11 is preferably configured to automatically update in the database D the location code of a container 9 in response to detection of the identification 10 of the container 9 by a detector 18*a*-18*d*.

A program installed on a mobile communication device 22, such as a phone or a tablet is preferably configured to detect a change in location code of a container 9. The program can preferably further be configured to indicate, e.g. on a display thereof, to the user of the mobile communication device 22 an alarm or the updated location of the container 9.

Alternatively, the control system 11 is configured to automatically send a signal to a program installed on a mobile communication device 22, such as a phone or a tablet in response to detection of the identification 10 of the container 9 by a detector 18*a*-18*d*.

In addition to said first container 9 one or more further containers 9 belonging to said plurality of containers 9 are moved to their destination floors F1-Fn with the same steps as described above referring to first container 9. Accordingly, with one or more further containers 9 the following steps are performed:

- moving a further container 9 belonging to said plurality of containers 9 to a loading floor L0;
- after said moving the load receiving unit 7 back to the loading floor (F0), loading on the load receiving unit 7, the further container 9 belonging to said plurality of containers 9;
- determining by the control system 11 destination floor F1-Fn of the second container 9 comprising detecting the identification 10 of the second container with a detector;
- automatically moving the load receiving unit 7 vertically in the elevator shaft S to the destination floor F1-Fn of the further container 9;
- unloading the further container from the load receiving unit 7 to the destination floor F1-Fn of said further container 9;
- moving the load receiving unit 7 back to the loading floor F0 in particular for receiving a further transport container 9 to be moved to its destination floor.

Said automatically moving comprises controlling by the control system 11, in particular by a sub-control system 30 of the control system 11 the elevator GE to move the load receiving unit 7 vertically in the elevator shaft S to the destination floor F1-Fn of the further container 9. These steps are repeated preferably plurality of times, such as for 2 or 3 or 4 or 5, or more than 5 times whereby a great number of containers become moved to their destination floors with the method efficiently. The destination floors F1-Fn of the first container 9 and the further container(s) 9 preferably include plurality of different destination floors F1-Fn, such as 2 or 3 or 4 or 5, or more than 5 different destination floors F1-Fn whereby a great number of containers become moved to plurality of different destination floors with the method efficiently. Also moving of the load receiving unit 7 back to the loading floor F0 can be performed automatically as defined.

Each said loading a container 9, i.e. loading the first container and loading each further container, on the load receiving unit 7 is preferably performed automatically controlled by the control system 11, in particular automatically controlled by a sub-control system 50 thereof, which sub-control system 50 is configured to automatically operate one or more loading devices 4,5. Preferred details of the one or more loading devices 4,5 are illustrated in FIGS. 1, 3 and 6.

Each said unloading a container 9, i.e. the first container or the further container 9, from the load receiving unit 7 to its destination floor F1-Fn is preferably performed automatically controlled by the control system 11, in particular automatically controlled by a sub-control system 60 thereof, which sub-control system 60 is configured to automatically operate one or more unloading devices 5,6. Preferred details of the one or more unloading devices 5,6 are illustrated in FIGS. 1, 4 and 6.

Said one or more loading devices 4,5 and said one or more unloading devices 5,6 are configured to move the container 9 to be loaded/unloaded between a floor (F0 and/or F1-Fn, respectively) of the building and the load receiving unit, said moving comprising at least horizontal movement, preferably through an opening 21 leading into the elevator shaft S.

In the preferred embodiment, as illustrated in FIG. 1, said one or more said one or more loading devices 4,5 comprise a loading device 5 mounted on the load receiving unit 7, in particular on top of a transport platform 7*a* of the load receiving unit 7, and a loading device 4 mounted at the loading floor F0, preferably in front of an opening 21 leading to the shaft S in which the load receiving unit 7 is movable. Preferred details of the loading devices 4,5 are illustrated in FIG. 6.

In the preferred embodiment, as illustrated in FIG. 1, said one or more unloading devices 5,6 comprise an unloading device 5 mounted on the load receiving unit 7, in particular on top of a transport platform 7*a* of the load receiving unit 7, as well as an unloading devices 6 mounted at plurality of destination floors F1-Fn, in front of openings 21 leading to the shaft S in which the load receiving unit 7 is movable. Preferred details of the unloading devices 5,6 are illustrated in FIG. 6.

In the embodiments of FIG. 3, the loading is performed particularly such that the loading device 4 mounted at the loading floor F0 moves the container 9 to be loaded horizontally to be carried by the loading device 5 mounted on the load receiving unit 7, which further moves it horizontally on the load receiving unit 7 to its position. One of these devices may be unnecessary, if the other is alone able to move a container 9 from the loading floor F0 onto the load receiving unit 7.

In the embodiments of FIG. 4, the unloading is performed particularly such that the unloading device 5 mounted on the load receiving unit 7 moves the container 9 to be unloaded horizontally to be carried by the unloading device 6 mounted at the destination floor F1-Fn of the container 9 to be unloaded. The unloading device 6 mounted at the destination floor F1-Fn moves the container 9 to be unloaded further horizontally away from proximity of the shaft S. One of these devices may be unnecessary, if the other is alone able to move a container 9 from the load receiving unit F0 to the destination floor F1-Fn of the container 9 to be unloaded.

In the embodiments of FIGS. 3 and 4, a device 5 mounted on the load receiving unit 7 serves both as a loading device and an unloading device. Thus, it is used in the method both for the loading step and unloading step.

As illustrated in FIG. 6, each said loading and/or unloading comprises a conveyor comprising conveying track T on top of which a transport container 9 can be moved horizontally supported by the conveying track T. The conveying track is preferably motor driven. Preferably, each of the conveyors is a roller conveyor, or alternatively a belt conveyor.

The load receiving unit 7 of the goods transport elevator GE is vertically movable along one or more vertically oriented guide rail lines 16. Thus, heavy and large transport containers 9 can be transported in the shaft S with relatively high speed and safety without constant human surveillance. It provides also the possibility to utilize the guide rail lines 16 in the final elevator, whereby a later transformation of the goods elevator to form a passenger elevator in its place is facilitated.

In an embodiment of a method for constructing a building comprises transporting construction material **9*d* and/or equipment 9*d'* inside a building under construction 1 as described referring to FIGS. 1-7. The method for constructing a building comprises constructing structures of the building under construction 1 using said construction 9*d* material and/or equipment 9*d'* transported in the floors F1-Fn of the building 1** under construction.

The method for constructing a building moreover comprises constructing a passenger elevator PE in place of the aforementioned elevator GE, said constructing comprising constructing a passenger elevator car 70 for transporting people in place of the load receiving unit 7 of the elevator GE, wherein the passenger elevator car 70 is made to comprise an interior delimited by floor, walls, ceiling and at least one automatic door 23; and thereafter using the passenger elevator car 70 to transport passengers between floors F0-Fn of the building. Said using preferably comprises receiving call signals from user interfaces, such as from user interfaces located at F0-Fn of the building and/or in the passenger elevator car 70 and/or mobile user interfaces, and moving the passenger elevator car 70 in response to said call signals.

In a preferred embodiment, the load receiving unit of the elevator for transporting goods does not comprise an automatic door. It may not comprise a door at all, as it is the case in the illustrated examples. Hereby, it is not intended for passenger transport. Due to lower safety requirements, some parts, such as a door can be even omitted totally, which makes loading and unloading of containers quick and smooth. This also makes it simple to implement the loading and/or unloading of the load receiving unit 7 with one or more automatically operated device(s) 4,5,6.

For the above mentioned reasons, the load receiving unit 7 of the goods elevator need not be provided with a closed space. Preferably, although not necessary, that is does not comprise an interior delimited by floor, walls, ceiling and an automatic door.

The aforementioned constructing a passenger elevator car 70 preferably comprises installing a new automatic door. The automatic door preferably comprises at least two sliding door leaves. This facilitates safety in passenger use. Hereby, the requirements of transporting of people can be met when transportation requirements of the transport containers 9 are not anymore take priority. Presence of an automatic door (i.e. a door opening and closing movement which is motor driven under control of a control system) 23 is not necessary when transporting said containers 9 with the goods elevator GE. However, such a door 23 is a typical requirement for convenient and safe use for passengers. Preferably, opening and closing movement of said automatic door 23 is motor driven under control of a control system. This control system may be for instance a newly installed control system or the control system 11 used during the method for transporting construction material and/or equipment inside a building 1 under construction or a part thereof such as the aforementioned sub-system 30 as such or as modified, in particular to fit into passenger elevator use.

In said constructing, the passenger elevator car 70 is preferably arranged to be vertically movable along one or more of the vertically oriented guide rail lines 16 of the load receiving unit 7 of the goods transport elevator GE. Thus, transformation of the goods elevator to form a passenger elevator in its place is performed utilizing components of the goods elevator GE, which facilitates swiftness and economy of the transformation. Preferably, one or more components comprised in the goods elevator car, such as one or more of a frame, guide members, such as roller guides or slide guides, a transport platform, are utilized in the constructing a passenger elevator car in place of the load receiving unit 7. Thus, transformation of the goods elevator GE to form a passenger elevator PE in its place is performed utilizing components of the goods elevator GE, which facilitates swiftness and economy of the transformation.

The arrangement for transporting construction material **9*d* and/or equipment 9*d'* inside a building under construction 1 of FIG. 1 is configured to implement the method as described referring to FIG. 1. Preferred details of the arrangement are described hereinafter as well as in reference to FIGS. 1-7. The building under construction 1 comprises plurality of vertically displaced floors F0-Fn. The arrangement comprises an elevator GE for transporting transport containers 9 in the building under construction 1, said elevator GE comprising at least a load receiving unit 7 vertically movable along one or more guide rail lines 16 in an elevator shaft S formed in the building under construction 1; and plurality of transport containers 9 each comprising a container body 9*a* delimiting an interior 9*b* where the construction material 9*d* and/or equipment 9*d'* stored by the container are positioned, and an identification 10 provided on the container body 9*a*, e.g. identification equipment mounted or markings printed thereon, for identifying the container and/or its destination in the building (e.g. the destination floor F1-Fn in the building); and one or more detectors 18*a*-18*d* within the building under construction 1** for detecting identifications 10 of containers 9 when they are within the detection ranges of the one or more detectors 18*a*-18*d*.

The arrangement further comprises a control system 11 configured to determine destination floor of the first container 9 said determining comprising at least detecting the identification 10 of the first transport container 9 with a detector; to automatically control the elevator (preferably by a sub-control system 30 of the control system 11, which sub-control system 30 is configured to automatically control movement of the load receiving unit 7) to move the load receiving unit 7 vertically in the elevator shaft S to the destination floor F1-Fn of the first container 9 for being unloaded to said destination floor F1-Fn of said first container.

The control system 11 is further configured to automatically control the elevator (preferably by a sub-control system 30 of the control system 11, which sub-control system 30 is configured to automatically control movement of the load receiving unit) to move the load receiving unit 7 vertically in the elevator shaft S back to the loading floor F0 for receiving a further transport container 9 to be moved to its destination floor.

The control system is moreover configured to determine destination floor of a further container 9 said determining comprising at least detecting the identification 10 of the further transport container 9 with a detector; and to automatically control the elevator, (preferably by a sub-control system 30 of the control system 11, which sub-control system 30 is configured to automatically control movement of the load receiving unit 7) to move the load receiving unit 7 vertically in the elevator shaft to the destination floor F1-Fn of the further container 9 for being unloaded to said destination floor of said further container; and to automatically control the elevator (preferably by a sub-control system 30 of the control system 11, which sub-control system 30 is configured to automatically control movement of the load receiving unit 7) to move the load receiving unit 7 vertically in the elevator shaft S back to the loading floor F0 for receiving a further transport container 9 to be moved to its destination floor.

The arrangement comprises one or more loading devices 4,5 for moving a container 9 to be loaded between the loading floor F0 and the load receiving unit 7, said moving comprising at least horizontal movement, preferably through an opening 21 leading into the elevator shaft S. In an embodiment illustrated FIGS. 1, 3 and 4, said one or more loading devices comprise a loading device 5 mounted on the load receiving unit 7, in particular on top of a transport platform 7*a* of the load receiving unit 7 and a loading device 4 mounted at the loading floor F0, preferably in front of an opening 21 leading to the shaft S in which the load receiving unit 7 is movable.

The controls system 11, in particular a sub-control system 50 thereof, is configured to automatically operate the one or more loading devices 4,5.

The arrangement moreover comprises one or more unloading devices 5,6 for moving a container 9 to be unloaded between the load receiving unit 7 and a destination floor F1-Fn said moving comprising at least horizontal movement, preferably through an opening leading 21 into the elevator shaft S. In an embodiment illustrated FIGS. 1, 3 and 4, said one or more unloading devices comprise an unloading device 5 mounted on the load receiving unit 7, in particular on top of a transport platform 7*a* of the load receiving unit 7 and unloading devices 6 mounted at destination floors F1-Fn, in front of openings 21 leading to the shaft S in which the load receiving unit 7 is movable. The control system 11, in particular a sub-control system 60 thereof, is configured to automatically operate the unloading devices 5,6.

The arrangement preferably comprises a storage 8 storing the plurality of said transport containers 9, which storage 8 is preferably outside the building under construction 1.

In FIG. 2, preferred structure and configuration of a container 9 is illustrated. The containers 9 are preferably of the same or at least substantially of the same size and shape. The containers have each four walls, a ceiling and a floor. One or more of the walls 9*c* of each container can be openable or comprise a door. It is preferable that the containers are rectangular cuboids.

Figure 7:
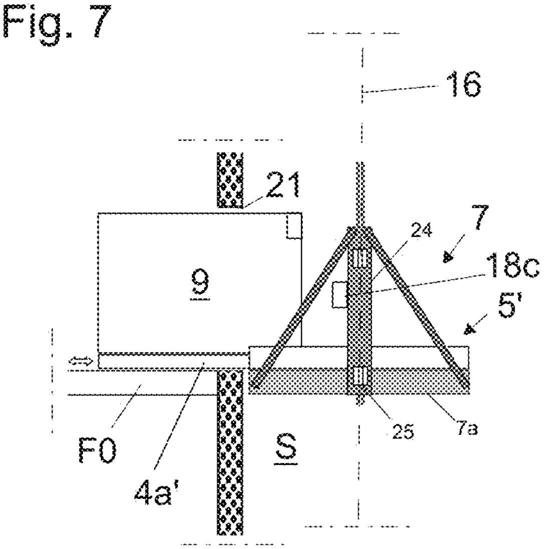
FIG. 7 illustrates a preferred alternative embodiment for loading and unloading a transport container.
Figure 8:
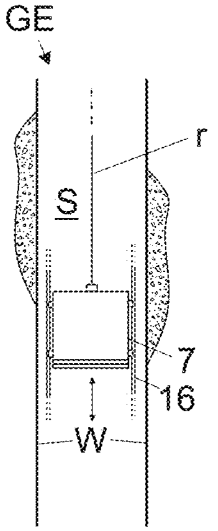
FIG. 8 illustrates partially the elevator for transporting transport containers from the side of the opening leading to the shaft in which the load receiving unit is movable.
Figure 9:
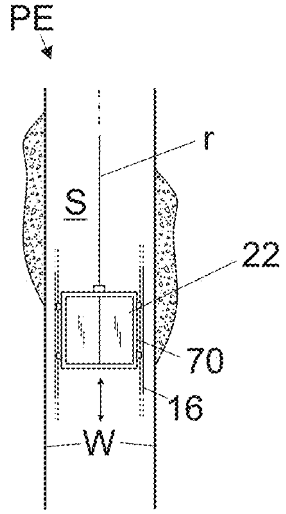
FIG. 9 illustrates partially a passenger elevator constructed in place of the elevator for transporting transport containers of FIG. 8.

FIG. 7 illustrates an embodiment, where a device 5' mounted on the load receiving unit 7 serves both as a loading device and an unloading device, which does not necessitate any devices for loading or unloading at the loading floor F0 or at the destination floors F1-Fn. The embodiment of FIG. 7 provides an alternative to the loading and unloading devices 4-6 illustrated in FIGS. 3 and 4. The device 5' comprises an extendible support member 4*a*' mounted on the load receiving unit 7 which extendible support member 4*a*' is horizontally extendable out from the shaft S for receiving a container 9 to be loaded on the load receiving unit 7 and retractable into the shaft S for carrying it into the shaft S so that it is supported by the load receiving unit 7. Correspondingly, the extendible support member 4*a*' mounted on the load receiving unit 7 is horizontally extendable out from the shaft S for carrying a container 9 to be unloaded from the load receiving unit 7. The device 5' is preferably motor driven and automatically operable by the control system 11, in particular a sub-control system thereof.

Preferably, the containers 9 are such large that the interior of each container is at least 4 m3 in volume, preferable larger. Thus, they can all serve for transporting inside them various different large objects. The width height and length of each container are each at least 1 m, preferable larger.

Preferably, the body of the container comprises metal, preferably majority (i.e. more than half) of its weight is produced by metal material. This means that the containers 9 are metal containers and they are durable for use in many construction sites.

The bodies 9*a* of each of the containers 9 preferably delimits an interior where the construction material and/or equipment stored by the container 9 are positioned, and the interiors 9*b* of the containers 9 are preferably of same or at least substantially same size and shape.

Generally, it is preferable that the aforementioned elevator shaft S is a space inside the building. This is advantageous since in this way, the construction time vertical transport as described can simply be performed using a space which can safely and efficiently used also for passenger transport of the elevator of the final building. The elevator shaft S is preferably a space surrounded by walls W of the building, said walls preferably being concrete walls.

In the above, examples are described where said determining comprises retrieving from the database D the destination floor F1-Fn associated with an identification code of the transport container 9 in question. Generally, determining the destination floor can also be performed differently, such as detecting the destination floor associated with the container 9 from the identification 10 itself in case the identification 10 itself identifies the destination floor of the container 9 in question.

In the above, examples are described where destination of a container in the building is a destination floor F1-Fn in the building. However, the destination can also be more specific, or the container can have plurality of other destinations, such as destinations along the path of the container to a final destination within the building 1. Generally, a destination floor F1-Fn in the building under construction 1 is however a preferable destination associated with each container 9 because the goods elevator GE forms a transportation means where paths of different containers 9 diverge from each other and because a destination floor F1-Fn in the building under construction 1 is a simple input for the goods elevator GE well compatible with the tasks performed by it.

In the Figures, examples are illustrated where the load receiving unit 7 comprises only one level on which a transport container 9 can be received by the load receiving unit 7, the load receiving unit 7 being suitable for receiving and transporting only one transport containers 9 at a time. However, this is not necessary since the load receiving unit 7 could alternatively have two or more storeys for receiving two or more transport containers 9 (addition to the container 9 described) on top of each other. In this kind of case, the method would comprise additional steps in addition to those described, particularly steps related to delivery of the additional transport containers 9. In this kind of case, the load receiving unit 7 could be in the form of a double-decker, for example.

As mentioned, the transport units 9 are preferably transport containers, for which reason the examples show and describe the transport units 9 in the form of transport containers. However, this is not necessary since generally, the transport unit could alternatively have some other form. For example, alternatively, a pallet could be used.

It is to be understood that the above description and the accompanying Figures are only intended to teach the best way known to the inventors to make and use the invention. It will be apparent to a person skilled in the art that the inventive concept can be implemented in various ways. The above-described embodiments of the invention may thus be modified or varied, without departing from the invention, as appreciated by those skilled in the art in light of the above teachings. It is therefore to be understood that the invention and its embodiments are not limited to the examples described above but may vary within the scope of the claims.

The invention claimed is:

1. A method for transporting construction material or equipment inside a building under construction, the building under construction including a plurality of vertically displaced floors, and the method comprising:

providing an elevator for transporting transport units in the building under construction, said elevator including at least a load receiving unit vertically movable along one or more guide rail lines in an elevator shaft, the elevator shaft being formed in the building under construction;

providing a plurality of transport units, each of the plurality of transport units carrying construction material or equipment, each respective transport unit among the plurality of transport units including a corresponding identification on the respective transport unit, the corresponding identification identifying the respective transport unit, or a destination floor of the respective transport unit in the building under construction;

providing one or more detectors in the building under construction for detecting the corresponding identifications on each of the plurality of transport units when the corresponding identification is within a detection ranges of the one or more detectors;

moving a first transport unit among the plurality of transport units to a loading floor;

loading the first transport unit on the load receiving unit;

determining, by a control system, a destination floor of the first transport unit based on the corresponding identification of the first transport unit detected with at least one among the one or more detectors;

automatically moving the load receiving unit vertically in the elevator shaft to the destination floor of the first transport unit; and unloading the first transport unit from the load receiving unit to the destination floor of said first transport unit.

2. The method according to claim 1, wherein each of the plurality of transport units is a transport containers including a container body, each respective transport unit among the plurality of transport units including the corresponding identification on the container body of the respective transport unit.

3. The method according to claim 1, wherein the method further comprises:

moving the load receiving unit back to the loading floor for receiving a further transport unit to be moved to its destination floor after said unloading.

4. The method according to claim 1, wherein the method comprises:

storing the plurality of transport units in a storage, the storage being outside of the building under construction.

5. The method according to claim 1, wherein said automatically moving the load receiving unit comprises:

controlling, by the control system, the elevator to move the load receiving unit vertically in the elevator shaft to the destination floor of the first transport unit.

6. The method according to claim 1, wherein said corresponding identification on the respective transport unit stores or presents in a detectable manner an identification code of the respective transport unit or the destination floor of the respective transport unit.

7. The method according to claim 1, wherein the control system includes a database.

8. The method according to claim 1, wherein said determining comprises retrieving, from a database, the destination floor associated with an identification code of the first transport unit.

9. The method according to claim 1, further comprising:

providing the control system for automatically controlling movement of the load receiving unit.

10. The method according to claim 1, further comprising:

detecting the corresponding identification of the first transport unit when the first transport unit is at the loading floor or at least partially on the load receiving unit, the at least one among the one or more detectors being mounted at the loading floor or on the load receiving unit.

11. The method according to claim 1, wherein said one or more detectors includes a plurality of detectors within the building under construction, the plurality of detectors being at spaced apart locations and including one or more of:

a detector at an entrance of the building under construction, a detector at the loading floor, a detector on the load receiving unit, or a detector at one or more destination floors.

12. The method according to claim 1, wherein each of said one or more detectors has a corresponding detection range, detection of a corresponding identification of a-one of the plurality of transport units indicating that the one of the plurality of transport units is within the corresponding detection range of the one or more detectors.

13. The method according to claim 1, wherein the control system includes a database storing location codes associated with identification codes of the plurality of transport units.

14. The method according to claim 1, wherein the control system includes a database that is readable by a user interface program installed on a mobile communication device.

15. The method according to claim 1, further comprising:
automatically updating, by the control system, a location code of the first transport unit in a database in response to detection of the corresponding identification of the first transport unit by the at least one among the one or more detectors; or
automatically sending, by the control system, a signal to a program installed on a mobile communication device in response to detection of the corresponding identification of the first transport unit by the at least one among the one or more detectors.

16. The method according to claim 1, further comprising:
moving a further transport unit among said plurality of transport units to the loading floor;
loading on the load receiving unit the further transport unit;
determining, by the control system, a destination floor of the further transport unit based on the corresponding identification of the further transport unit detected with at least one among the one or more detectors;
automatically moving the load receiving unit vertically in the elevator shaft to the destination floor of the further transport unit; and
unloading the further transport unit from the load receiving unit to the destination floor of said further transport unit.

17. The method according to claim 16, wherein the destination floors of the first transport unit and destination floor of the further transport unit include a plurality of different destination floors.

18. TheA method according to claim 1, wherein
said loading the first transport unit or said unloading the first transport unit is automatically performed by a sub-control system of the control system using one or more loading devices; or
said unloading the first transport unit is automatically performed by a sub-control system of the control system using one or more unloading devices.

19. A method for constructing a building comprising:
transporting construction material or equipment inside a building under construction according to the method of claim 1; and
constructing structures of the building under construction using said construction material or equipment transported in the floors of the building under construction.

20. The method according to claim 1, further comprising:
constructing a passenger elevator car for transporting people in place of the load receiving unit of the elevator, the passenger elevator car including an interior delimited by a floor, walls, a ceiling and at least one automatic door; and
transport passengers between the floors of the building using the passenger elevator car after the constructing the passenger elevator car.

21. An arrangement for transporting construction material or equipment inside a building under construction, the building under construction including a plurality of vertically displaced floors, and the arrangement comprising:
an elevator for transporting transport units in the building under construction, said elevator including at least a load receiving unit vertically movable along one or more guide rail lines in an elevator shaft, the elevator shaft being in the building under construction;
a plurality of transport units, each of the plurality of transport units carrying construction material or equipment, each respective transport unit among the plurality of transport units including a corresponding identification on the respective transport unit, the corresponding identification identifying
the respective transport unit, or
a destination floor of the respective transport unit in the building under construction;
one or more detectors in the building under construction for detecting the corresponding identifications on each of the plurality of transport units when the corresponding identification is within a detection ranges of the one or more detectors; and
a control system configured to
determine a destination floor of a first transport unit among the plurality of transport units based on the corresponding identification of the first transport unit detected with at least one among the one or more detectors, and
automatically control the elevator to move the load receiving unit vertically in the elevator shaft to the destination floor of the first transport unit for unloading of the first transport unit to said destination floor of said first transport unit.

22. The arrangement according to claim 21, wherein the control system is configured to:
determine a destination floor of a further transport unit among the plurality of transport units based on the corresponding identification of the further transport unit detected with at least one among the one or more detectors; and
automatically control the elevator to move the load receiving unit vertically in the elevator shaft to the destination floor of the further transport unit for unloading of the further transport unit to said destination floor of said further transport unit.

* * * * *